United States Patent
Iwayasu

(10) Patent No.: US 10,177,409 B2
(45) Date of Patent: Jan. 8, 2019

(54) ADDITIVE OF ELECTROLYTIC SOLUTION FOR LITHIUM SECONDARY BATTERY, ELECTROLYTIC SOLUTION FOR LITHIUM SECONDARY BATTERY USING THE SAME AND LITHIUM SECONDARY BATTERY

(71) Applicant: Hitachi, Ltd., Chiyoda-ku, Tokyo (JP)

(72) Inventor: Norio Iwayasu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 200 days.

(21) Appl. No.: 14/883,899

(22) Filed: Oct. 15, 2015

(65) Prior Publication Data

US 2016/0111753 A1 Apr. 21, 2016

(30) Foreign Application Priority Data

Oct. 16, 2014 (JP) .................. 2014-211311

(51) Int. Cl.
- *H01M 10/05* (2010.01)
- *H01M 10/0567* (2010.01)
- *H01M 10/0569* (2010.01)
- *H01M 10/052* (2010.01)

(52) U.S. Cl.
CPC ..... *H01M 10/0567* (2013.01); *H01M 10/052* (2013.01); *H01M 10/0569* (2013.01); *H01M 2300/0037* (2013.01)

(58) Field of Classification Search
CPC ......... H01M 10/0567; H01M 10/0569; H01M 10/052; H01M 2300/0037
See application file for complete search history.

(56) References Cited

U.S. PATENT DOCUMENTS

2006/0014066 A1   1/2006   Nishimoto et al.

FOREIGN PATENT DOCUMENTS

| JP | 2002-208310 A | 7/2002 |
| JP | 2008-218404 A | 9/2008 |
| JP | 2009-4258 A | 1/2009 |

OTHER PUBLICATIONS

English Translation of JP 2008-218404.*

* cited by examiner

*Primary Examiner* — Ula C Ruddock
*Assistant Examiner* — Frank A Chernow
(74) *Attorney, Agent, or Firm* — Crowell & Moring LLP

(57) ABSTRACT

In the present invention, a compound represented by Formula (1) is used as an additive of electrolytic solution for a lithium secondary battery,

[Chemical Formula 1]

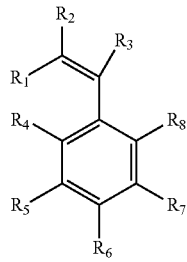

Formula (1)

(where, in Formula (1), $R_1$ to $R_3$ respectively denote any of hydrogen, an alkyl group and a functional group containing halogen; $R_4$ to $R_8$ respectively denote any of hydrogen, a hydrocarbon group, a functional group containing halogen and $BF_3X$; X denotes alkali metal or alkali earth metal; and at least any of $R_4$ to $R_8$ is $BF_3X$).

9 Claims, 1 Drawing Sheet

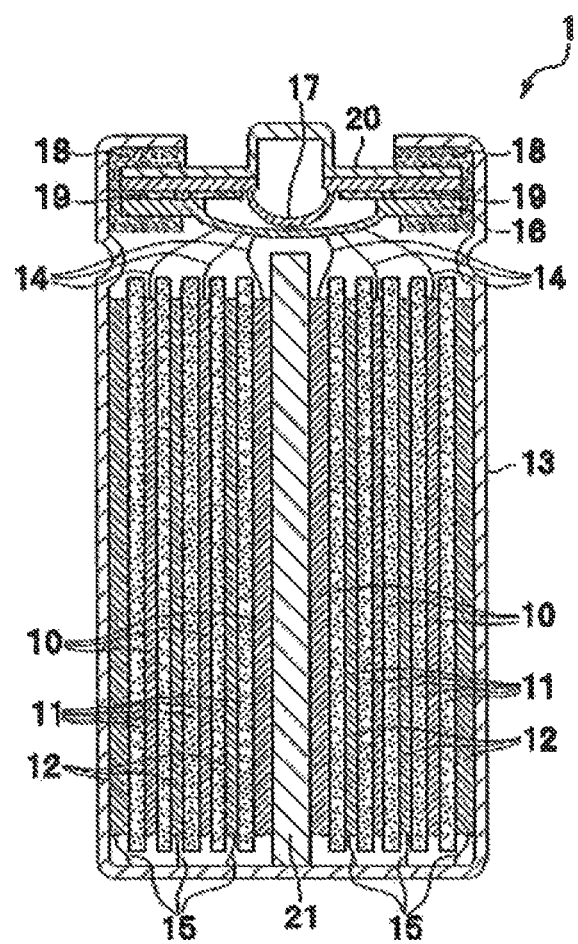

ADDITIVE OF ELECTROLYTIC SOLUTION FOR LITHIUM SECONDARY BATTERY, ELECTROLYTIC SOLUTION FOR LITHIUM SECONDARY BATTERY USING THE SAME AND LITHIUM SECONDARY BATTERY

BACKGROUND OF THE INVENTION

1. Field of the Invention

The present invention relates to an additive of electrolytic solution for a lithium secondary battery, electrolytic solution for a lithium secondary battery us in the same and a lithium secondary battery.

2. Description of the Related Art

For a lithium secondary battery, an electrolytic solution that is obtained by dissolving an electrolyte salt into organic solvent is used. However, there is a problem that, since such an organic solvent used for electrolytic solution causes reductive decomposition on an electrode surface, cycle characteristics of a secondary battery are deteriorated. In order to suppress such characteristic deterioration of a secondary battery, a lithium secondary battery in which a protective layer for suppressing the reaction of electrolytic solution is formed on an electrode surface is used. Examples of such a protective layer include: water-soluble polymer that coats a negative electrode in advance; a film that is formed by adding a film-forming agent such as vinylene carbonate into electrolytic solution and causing a battery charge/discharge reaction; and the like.

However, such films are known to increase battery resistance. Therefore, in order to improve output of the battery, reduction of such battery resistance has been sought.

Whereas, in order to improve the safety of a lithium secondary battery, adoption of polyelectrolytes has been tried. JP-2008-2184 discloses, in order to improve ion conductivity of a solid secondary battery that uses a solid electrolyte material, the solid secondary battery that uses a boron-containing polymer salt mixed in a polymer material. JP-2002-208310-A discloses an invention that utilizes a boron-containing compound for a solid polymer electrolyte. JP-2009-004258-A discloses an invention that uses a boron-containing salt as an electrolyte salt, in order to suppress expansion during storage at high temperature.

In JP-2008-218404-A and JP-2002-208310-A, the boron-containing compound is mixed in the polymer electrolyte. However, there is a problem that, since the polymer electrolyte has low ion conductivity, resistance of the battery becomes high and output characteristics thereof are deteriorated. Also, since a solid electrolyte interface (SEI) made of the materials described in JP-2009-004258-A has low ion conductivity, its battery resistance is considered to be high.

SUMMARY OF THE INVENTION

The present invention aims to provide a lithium secondary battery with low battery resistance and high output.

To achieve the above object, the present invention provides an additive of electrolytic solution for a lithium secondary battery, which is represented by Formula (1),

[Chemical Formula 1]

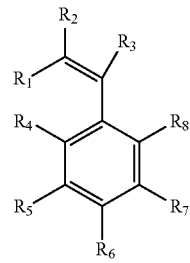

Formula (1)

(where, in Formula (1), $R_1$ to $R_3$ respectively denote any of hydrogen, an alkyl group and a functional group containing halogen; $R_4$ to $R_8$ respectively denote any of hydrogen, a hydrocarbon group, a functional group containing halogen and $BF_3X$; X denotes alkali metal or alkali earth metal; and at least any of $R_4$ to $R_8$ is $BF_3X$).

According to the present invention, the lithium secondary battery with low battery resistance can be provided. Problems, structures and effects that have not been stated herein will be clarified by following description of the preferred embodiments.

BRIEF DESCRIPTION OF THE DRAWINGS

FIG. 1 is a diagram that schematically illustrates an internal structure of a battery according to one embodiment of the present invention.

DESCRIPTION OF THE PREFERRED EMBODIMENTS

Preferred embodiments of the present invention will be described below with reference to the accompanying drawings. The following description gives concrete examples of the contents of the present invention, by which the present invention is not limited, and various modifications and corrections can be made by a person skilled in the art within the scope of the technical idea that is disclosed in the present specification. Also, in all of the drawings for explaining the present invention, the same reference numerals refer to the parts having the same functions, and their repeated explanation may be omitted.

FIG. 1 is a diagram that schematically illustrates an internal structure of a battery according to one embodiment of the present invention. The battery 1 shown in FIG. 1 according to one embodiment of the present invention includes: a positive electrode 10; a separator 11; a negative electrode 12; a battery case (that is, a battery can) 13; a positive electrode current-collecting tab 14; a negative electrode current-collecting tab 15; an inner lid 16; an internal pressure releasing valve 17; a gasket 18; a positive temperature coefficient (PTC) resistive element 19; a battery lid 20; and a shaft center 21. The battery lid 20 is an integrated component that is composed of: the inner lid 16; the internal pressure releasing valve 17; the gasket 18; and the PTC resistive element 19. Further, around the shaft center 21, the positive electrode 10, the separator 11 and the negative electrode 12 are wound.

The separator 11 is inserted between the positive electrode 10 and the negative electrode 12 so as to form an electrode group that is wound around the shaft center 21. As the shaft center 21, a known arbitrary shaft center can be used as long as it can support the positive electrode 10, the separator 11 and the negative electrode 12. The electrode group can have various shapes including not only a cylindrical shape shown in FIG. 1 but also a laminate of strip electrodes and an arbitrary shape such as a flat shape in which the positive electrode 10 and the negative electrode 12 are wound. A shape of the battery case 13 may be selected from a cylindrical shape, a flat oval shape, a flat elliptical shape, a square shape and the like in accordance with the shape of the electrode group.

A material for the battery case 13 is selected from materials such as aluminum, stainless steel and nickel plated steel, which have corrosion resistance against a nonaqueous electrolyte. Moreover, in the case of connecting the battery case 13 electrically with the positive electrode 10 or the negative electrode 12, the material for the battery case 13 is selected so as not to cause corrosion of the battery case 13 or deterioration of the material by being alloyed with lithium ions in a part where the battery case 13 is in contact with the nonaqueous electrolyte.

The electrode group is stored in the battery case 13, the negative electrode current-collecting tab 15 is connected to an inner wall of the battery case 13, and the positive electrode current-collecting tab 14 is connected to a bottom face of the battery lid 20. The electrolytic solution is poured into the battery case 13 before sealing the battery. As a method for pouring the electrolytic solution, the electrolytic solution is added directly to the electrode group in a state where the battery lid 20 is open, or the electrolytic solution is added via an inlet that is provided to the battery lid 20.

Thereafter, the battery lid 20 is adhered to the battery case 13 closely, thereby sealing a whole of the battery. In the case where the battery lid 20 is provided with the inlet for the electrolytic solution, the inlet is sealed as well. As the method for sealing the battery, known techniques such as welding and calking are exemplified.

A lithium ion battery according to one embodiment of the present invention can be manufactured by, for example, arranging a below-described negative electrode and positive electrode so that they may face each other via a separator, and then pouring an electrolyte. A structure of the lithium ion battery according to one embodiment of the present invention is not limited particularly, but usually, it can be a winding-type electrode group in which the positive electrode, the negative electrode and the separator that separates them are wound, or a laminate type electrode group in which the positive electrode, the negative electrode and the separator are laminated.

<Additive>

An additive of electrolytic solution for a lithium secondary battery of the present invention is represented by Formula (1). In the present invention, Formula. (1) represents an aromatic compound containing a polymerizable functional group. In Formula (1), $R_1$ to $R_3$ denote any of hydrogen, an alkyl group and a functional group containing halogen, respectively. $R_1$ to $R_3$ are preferably hydrogen. By adopting hydrogen to $R_1$ to $R_3$, solubility of the additive into the electrolytic solution can be improved. As a result, a film that is preferable for an electrode surface can be formed. By the selection of $R_3$, reaction potential of a double bond can be adjusted, so that the film that is preferable for the electrode can be formed easily. Further, at least any of $R_4$ to $R_8$ that are aromatic parts is $BF_3X$. It is more preferable that the more $BF_3X$ groups are present. Since the $BF_3X$ group is an electron-withdrawing group, if the more $BF_3X$ groups exist, the ion conductivity is improved, so that the battery resistance is considered to be decreased. X is alkali metal such as Na and K, or alkali earth metal such as Mg and Ca. In the light of decreasing the battery resistance, X is preferably alkali metal. The $BF_3X$ group functions as an ion exchanging part. Since X is alkali metal, dissociation of the $BF_3X$ group is increased, whereby the battery resistance is decreased. The remaining part among $R_4$ to $R_8$, which is not $BF_3X$, is any of hydrogen, a hydrocarbon group and a functional group containing halogen.

If the electrolytic solution in which the compound represented by Formula (1) is added is used for the lithium secondary battery, a polymerizable functional group in Formula (1) is decomposed by reduction during initial charge/discharge, thereby forming a film on the electrode. This film contains a compound represented by a formula (2).

[Chemical Formula 2]

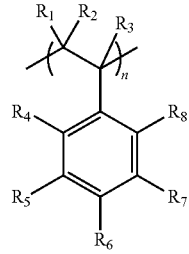

Formula 2

Incidentally, $R_1$ to $R_8$ in the formula (2) correspond to $R_1$ to $R_8$ in Formula (1), respectively. Further, "n" in the formula (2) is a repeating unit.

To a surface of the film, $BF_3^-$ that is derived from the compound represented by Formula (1) is bound. Since $BF_3^-$ has high lithium ion conductivity, a transport number of lithium ions between an active material and the electrode is high. Accordingly, this film has high lithium ion conductivity. As a result, battery resistance can be decreased, whereby the lithium secondary battery with high output can be provided.

Also, it is possible to produce the compound represented by the formula (2) in advance, and coat the active material with the compound represented by the formula (2) so as to produce the battery by using the active material. The active material to be coated may be either a positive electrode active material or a negative electrode active material. In order to decrease the battery resistance, it is preferable to coat the negative electrode active material. By coating the negative electrode active material, a functional group with high dissociation is formed in the thus formed film, whereby the battery with the low battery resistance cart be produced.

The film can be formed by: post-coating in which the additive that is added into the electrolytic solution is decomposed by the initial, charge of the battery so as to form the film; or pre-coating in which a film agent is added into a negative electrode combined agent so as to coat the negative electrode active material. The post-coating has an advantage of its easier process, because the additive is added into the electrolytic solution. In addition, since the film is formed by electrical potential of the active material, the uniform film can be formed on a surface of the active material that generates the electrical, potential. Whereas, in the pre-coating, it is possible to adjust a coating state.

Alternatively, the active material may be coated by: dispersing the active material into solvent; adding the compound represented by Formula (1) and a polymerization initiator therein; polymerizing the compound represented by Formula (1) by heat; and subsequently taking out the active material.

<Electrolytic Solution>

The electrolytic solution includes: nonaqueous solvent; an electrolyte salt; and an additive. Examples of the nonaqueous solvent that can be used for the electrolytic solution include: ethylene carbonate; propylene carbonate; butylene carbonate; dimethyl carbonate; diethyl carbonate; methylethyl carbonate; 1,2-dimethoxyethane; 2-methyltetrahydrofuran; dimethyl sulfoxide; 1,3-dioxolane; formamide; dimethylformamide; methyl propionate; ethyl propionate; phosphoric triester; trimethoxymethane; dioxolane; diethyl ether; sulfolane; 3-methyl-2-oxazolidinone; tetrahydrofuran; 1,2-diethoxyethane; chloroethylene carbonate; chloropropylene carbonate; and the like. In the light of decreasing the battery resistance, the selection of the component of the electrolytic solution is important. As the solvent, mixture of cyclic carbonate and chain carbonate is preferably used. Since mobility of ions is inversely proportional to viscosity of solvent, the lower viscosity of the solvent is more preferable. The cyclic carbonate has high dielectric constant, but has high viscosity. On the other hand, the chain carbonate has low viscosity. Therefore, by using the cyclic carbonate and the chain carbonate to be mixed, the viscosity and the dielectric constant can be adjusted.

As the cyclic carbonate, ethylene carbonate is preferably used. As the chain carbonate, dimethyl carbonate, diethyl carbonate and methylethyl carbonate are preferably used. Further, as the chain carbonate, a plurality of them may be used in combination.

When a volume of the cyclic carbonate in the nonaqueous solvent is denoted by "a", and a volume of the chain carbonate in the nonaqueous solvent is denoted by "b", a volume ratio (a/(a+b)) between the volume of the cyclic carbonate (a) and the volume of the chain carbonate (b) is preferably within a range of $0 \leq a/(a+b) \leq 0.9$. The reason for this is because, if the volume ratio between the cyclic carbonate and the chain carbonate is adjusted, a multiplier effect with the compound represented by Formula (1) is exhibited, so that an effect of decreasing the resistance can be enhanced as a result. A component of the solvent causes a decomposition reaction at the electrode during the initial charge, and a decomposed product is generated on the electrode surface. The decomposed product is an element that determines the battery resistance. The battery in which the compound represented by Formula (1) is added into the electrolytic solution causes a reaction at the electrode, and the reaction proceeds together with the decomposition of the electrolytic solution. Thus, by setting the volume ratio (a/(a+b)) within a range of $0 < a/(a+b) \leq 0.9$, the film made from the solvent and the compound represented by Formula (1) has low resistance. Moreover, in order to form the film with still lower resistance, the volume ratio (a/(a+b)) is preferably set within a range of $0 < a/(a+b) \leq 0.5$.

As the electrolyte salt, various kinds of lithium salts such as $LiPF_6$, $LiBF_4$, $LiClO_4$, $LiCF_3SO_3$, $LiCF_3CO_2$, $LiAsF_6$, $LiSbF_6$ and imide salts of lithium represented by lithium trifluoromethanesulfoneimide, and the like can be used. An electrolytic solution that is obtained by dissolving these salts into the above-described solvent can be used as the electrolytic solution for the battery. In order to enhance the effect of decreasing the resistance, the selection of the electrolyte salt is important. As the electrolyte salt, $LiPF_6$, $LiBF_4$ and $LiClO_4$ are preferable. $LiPF_6$ and $LiBF_4$ are further preferable, and $LiPF_6$ is particularly preferable. If $LiPF_6$ is used, it affects the component of the film that is made of the compound represented by Formula (1), and the film with the low resistance is accordingly formed, whereby the battery resistance is considered to be decreased.

An adding amount (Y) (% by weight) of the compound represented by Formula (1) is within a range of $0 < Y \leq 5$, and is preferably within a range of $0.001 \leq Y \leq 3$ with respect to the electrolytic solution. If the adding amount is more than 5% by mass, an irreversible capacity is increased, so that a battery capacity is decreased. Further, if the adding amount is less than 0.001% by mass, a concentration of the component derived from the additive, which exists on an electrode interface, is decreased, so that the ion conductivity of an SEI film cannot be improved sufficiently. In order to improve the ion conductivity of the SEI film and decrease the battery resistance, the adding amount Y of the compound represented by Formula (1) is particularly preferably within a range of $0.005 \leq Y \leq 1$.

As the additive, in addition to the additive represented by Formula (1), one kind or more of a second additive that has another structure can be further used in combination. Examples of the second additive include vinylene carbonate, fluoroethylene carbonate, 1,3-propanesultone, 1,3-propenesultone, ethylene sulfate and their derivatives. Among them, vinylene carbonate, fluoroethylene carbonate, 1,3-propenesultone and their mixture are preferable. Only with the additive represented by Formula (1), it is possible to form a film which has higher lithium ion conductivity than that of a film made only with a conventional additive such as, for example, vinylene carbonate. The reason for this is because the lithium ion conductivity of the compound represented by Formula (1) is higher than that of vinylene carbonate. Electric charge is consumed while forming the SET film, but since the additive such as vinylene carbonate has easy reducibility, the film can be formed efficiently on a surface of the negative electrode. Moreover, by adding the second additive, the film formation proceeds while the film component made with the second additive is mixed into the film that is made with the additive represented by Formula (1). Accordingly, it is considered that a finer film structure can be obtained and more stable film can be formed. As a result, a life property of the battery is improved. Further, the film that is generated with the combination of the compound represented by Formula (1) and the second additive exhibits high ion conductivity, so that the resistance is considered to be decreased further.

An adding amount (Z) (% by weight) of the second additive is preferably within a range of $0 < Z \leq 10$, and is more preferably within a range of $0.1 \leq Z \leq 2$ with respect to a total mass of the nonaqueous solvent and the electrolyte salt.

Other various kinds of additives can be mixed as necessary. An additive for inhibiting overcharge such as biphenyl and cyclohexylbenzene; an additive for adding flame-retardance or incombustibility to the electrolytic solution by its substitution into a phosphate and/or a halogen; an additive for suppressing elution of Mn from the positive electrode active material; a self-extinguishing additive; an additive for improving wettability of the electrode or the separator; and the like can be added into the electrolytic solution according to the respective purposes. A total concentration of these additives is preferably less than 10% by mass with respect to the total mass of the nonaqueous solvent and the electrolyte salt.

As the electrolyte, a solid electrolyte can be used, but in the light, of decreasing the resistance, the electrolytic solution is preferably used. In the case of using a solid polymer electrolyte (a polymer electrolyte), ion conductive polymer such as polyethylene oxide, polyacrylonitrile, polyvinylidene fluoride, polymethylmethacrylate, polyhexafluoropropylene and polyethylene oxide can be used as the electrolyte. In the case of using such solid polymer electrolyte, there is a merit that the separator 11 can be omitted.

Further, ionic liquid can also be used. For example, a combination of ionic liquid is selected from: 1-ethyl-3-methylimidazolium tetrafluoroborate (EMI-BF4); a mixed complex of $LiN(SO_2CF_3)_2$ (LiTFSI) as a lithium salt with triglyme and tetraglyme; an alicyclic quaternary ammonium cation (N-methyl-N-propylpyrrolidinium is exemplified); and an imide anion (bis(fluorosulfonyl)imide is exemplified) so that the combination may not cause decomposition at the positive electrode 10 and the negative electrode 12, and can be used for the battery according to the present embodiment.

<Negative Electrode>

The negative electrode includes: a negative electrode active material; a binder; and a collector. As the negative electrode active material, natural graphite; an easily graphitized carbon material obtained from petroleum coke, coal pitch coke or the like, which is treated by heat at 2500° C. or more; mesophase carbon or amorphous carbon; carbon fiber; metal that can be alloyed with lithium; or a material that supports metal on surfaces or carbon particles is used. For example, the metal is selected from lithium, silver, aluminum, tin, silicon, indium, gallium, magnesium, and alloy of them. Moreover, the metal and an oxide of the metal can be used as the negative electrode active material. Further, lithium titanate can also be used. By the selection of the negative electrode active material, the battery resistance can be further decreased. As the negative electrode active material, natural graphite, artificial graphite, amorphous carbon and lithium titanate are preferably used. It is known that, depending on the kind of the negative electrode active material, characteristics of the film that is generated when being adopted to the battery are changed. It is considered that, by adding the compound represented by Formula (1) as the additive, it affects the characteristics of the film, and as a result, the battery resistance can be decreased.

On the negative electrode, the film containing the compound represented by the formula (2) is formed. This film preferably coats the negative electrode active material. $BF_3^-$ in the formula (2) has high lithium ion conductivity, and a transport number of lithium ions between the active material and the electrode is high. The SEI film generated on a surface of the negative electrode active material contains the compound represented by the formula (2), whereby the resistance of the film can be decreased. Incidentally, in the case where a solid electrolyte layer contains the compound represented by the formula (2), the compound represented by the formula (2) improves ion conductivity of the solid electrolyte layer, but does not decrease resistance of an interface between the negative electrode and the electrolyte layer.

<Separator>

The separator 11 is inserted between the positive electrode 10 and the negative electrode 12 that are produced in the above-described methods, whereby a short circuit between the positive electrode 10 and the negative electrode 12 is prevented. As the separator 11, a polyolefin-based polymer sheet that is made of polyethylene, polypropylene or the like; a double-layer structure in which the polyolefin-based polymer sheet and a fluorine-based polymer sheet represented by polytetrafluoroethylene are welded and adhered to each other; or the like can be used. A thin layer of a mixture of ceramics and the binder can be formed on a surface of the separator 11 so that the separator 11 may not be shrunk when battery temperature becomes high. Since the separator 11 is required to permeate the lithium ions during the charge and discharge of the battery, a separator that has a pore diameter ranging from 0.01 µm to 10 µm and porosity ranging from 20% to 90% can be used generally for a lithium ion battery.

<Positive Electrode>

The positive electrode 10 includes: a positive electrode active material; a conductant agent; a binder; and a collector. Representative examples of the positive electrode active material include: $LiCoO_2$, $LiNiO_2$ and $LiMn_2O_4$. Other examples thereof include: $LiMnO_3$; $LiMn_2O_3$; $LiMnO_2$; $Li_4Mn_5O_{12}$; $LiMn_{2-x}M_xO_2$ (herein, M is at least one kind selected from a group consisting of Co, Ni, Fe, Cr, Zn and Ti, x=0.01 to 0.2); $Li_2Mn_3MO_8$ (herein, M is at least one kind selected from a group consisting of Fe, Co, Ni, Cu and Zn); $Li_{1-x}A_xMn_2O_4$ (herein, A is at least one kind selected from a group consisting of Mg, B, Al, Fe, Co, Ni, Cr, Zn and Ca, x=0.01 to 0.1); $LiNi_{1-x}M_xO_2$ (herein, M is at least one kind selected from a group consisting of Co, Fe, and Ga, x=0.01 to 0.2); $LiFeO_2$; $Fe_2(SO_4)_3$; $LiCo_{1-x}M_xO_2$ (herein, M is at least one kind selected from a group consisting of Ni, Fe, and Mn, x=0.01 to 0.2); $LiNi_{1-x}M_xO_2$ (herein, M is at least one kind selected from a group consisting of Mn, Fe, Co, Al, Ga, Ca and Mg, x=0.01 to 0.2); $Fe(MoO_4)_3$; $FeF_3$; $LiFePO_4$; $LiMnPO_4$ and the like. One kind or more among them may be used in mixture as the positive electrode active material. Further, the positive electrode active material may be covered with an inorganic substance or an organic substance in advance. Examples of the inorganic substance include oxides of Al, Mg, Ti, Zr, Mo, W and the like. As the organic substance, ion exchange resin that has an ion exchangeable functional group in its molecule is preferably used. A particle diameter of the positive electrode active material is usually regulated so that it may not be more than a thickness of a combined agent layer which is composed of: the positive electrode active material; the conductant agent; and the binder. If there is a coarse particle having a size that is not less than the thickness of the combined agent layer in powder of the positive electrode active material, it is preferable to remove the coarse particle by sieve classification, wind flow classification or the like in advance so as to prepare the particles that are not larger than the thickness of the combined agent layer.

Moreover, since the positive electrode active material is generally oxide-based and thus has high electric resistance, the conductant agent that is made of carbon powder for supplementing electric conductivity is preferably used. Since both of the positive electrode active material and the conductant agent are usually powder, it is possible to mix the binder into the powder so as to bind the powder together and bond the powder to the collector at the same time.

As the collector of the positive electrode 10, an aluminum foil with a thickness ranging from 10 µm to 100 µm; an aluminum perforated foil with a thickness ranging from 10 µm to 100 µm and a pore diameter ranging from 001 mm to 10 mm; expanded metal; a foamed metal plate; or the like is used. Beside the aluminum, materials such as stainless steel and titan can be adopted. The arbitrary collector can be used without limitation of its material, shape, manufacturing method and the like.

Positive electrode slurry obtained by mixing: the positive electrode active material; the conductant agent; the binder; and organic solvent is bonded to the collector by a doctor blade method, a dipping method, a spray method or the like, thereafter, the organic solvent is dried, and the thus obtained combined agent is molded by pressure with a roll press, whereby the positive electrode 10 can be produced. Also, by repeating the processes from the coating to the drying plural times, plurality of the combined agent layers can be laminated onto the collector.

<Battery System>

The lithium battery using the compound represented by Formula (1) has an excellent property of low resistance. Thus, heat generation that is caused by internal resistance of the battery can be suppressed during the use of the battery. Therefore, a cooling mechanism of the battery can also be simplified, and the lithium battery using the compound represented by Formula (1) is useful not only as a compact battery for a portable device but also as an on-vehicle large battery.

EXAMPLES

Hereinafter, the present invention will be described more specifically by way of examples, but the present invention is not limited to these examples. Results of the present examples are shown in Table 1.

<Method for Producing Positive Electrode>

A positive electrode active material ($LiMn_{1/3}Co_{1/3}Ni_{1/3}O_2$), a conductant agent (SP270; produced by Nippon Graphite Industries, ltd.) and a polyvinylidene fluoride binder were mixed in a ratio of 85:7.5:7.5 in % by weight, and were fed and mixed into N-methyl-2-pyrrolidone, thereby producing slurry solution. Aluminum foil with a thickness of 20 μm was coated with the slurry by a doctor blade method, and the slurry was dried. A coating amount of the combined agent was 200 g/m². Thereafter, the above-obtained combined agent was pressed, whereby a positive electrode was produced.

<Method for Producing Negative Electrode>

As the negative electrode active material, artificial graphite was used. The artificial graphite and polyvinylidene fluoride were mixed in a ratio of 95:5 in % by weight, and were further fed and mixed into N-methyl-2-pyrrolidone, thereby producing slurry solution. Copper foil with a thickness of 10 μm was coated with the slurry by the doctor blade method, and the slurry was dried. The above-obtained combined agent was pressed so that its bulk density may be 1.5 g/cm³, thereby producing the negative electrode.

<Method for Producing Battery and Method for Evaluating Battery>

A separator was inserted between the positive electrode and the negative electrode, and they were wound. The thus obtained winding body was put into a battery can for 18650. Thereafter, the electrolytic solution was injected therein, and the battery can was sealed. Three cycles of charge and discharge were carried out at a voltage ranging from 3.0 V to 4.2 V and a current value of 200 A. A discharge capacity at the third cycle was determined as a battery capacity. Further, the battery capacity is regulated at 100%, and was stated as 100% SOC. For measuring direct current resistance (DCR) of a battery, the battery was set at 50% SOC and was charged at current values of 1200 mA, 2400 mA and 3600 mA for 10 seconds respectively, whereby the DCR was calculated from relationships between the obtained voltage drop amounts and the current values.

Example 1

For the electrolytic solution, $LiPF_6$ as an electrolyte salt and EC/DMC/EMC in a volume ratio of 1/2/2 as solvent were used. A concentration of the electrolyte salt was 1.0 mol/L. As an additive, a compound A represented by the formula (3) was used. An adding amount of the compound A was 0.1 g (0.1% by weight) per 100 g of a total mass of the electrolyte salt and the solvent. Further, as a second additive, vinylene carbonate (VC) was used. An adding amount of the vinylene carbonate was 0.8 g (0.8% by weight) per 100 g of the total mass of the electrolyte salt and the solvent. Thereafter, the battery was produced and evaluated. Its battery capacity was 1250 mAh, and its DCR was 52.0 mΩ.

[Chemical Formula 3]

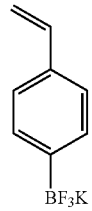

Formula 3

Example 2

A battery was produced similarly to Example 1 except for using a compound B represented by a formula (4) as the additive, and was then evaluated similarly to Example 1. As a result, its battery capacity was 1245 mAh, and its DCR was 52.1 mΩ.

[Chemical Formula 4]

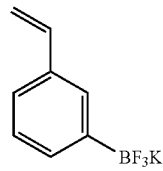

Formula 4

Example 3

A battery was produced similarly to Example 1 except for using 1,3-propenesultone as the second additive, and was then evaluated similarly to Example 1. As a result, its battery capacity was 1251 mAh, and its DCR was 53.2 mΩ.

Example 4

A battery was produced similarly to Example 2 except for using 1,3-propenesultone as the second additive, and was then evaluated similarly to Example 2. As a result, its battery capacity was 1248 mAh, and its DCR was 53.6 mΩ.

Example 5

A battery was produced similarly to Example 1 except for using a mixture of 0.6% by weight of VC and 0.2% by weight of 1,3-propenesultone as the second additive, and was then evaluated similarly to Example 1. As a result, its battery capacity was 1255 mAh, and its DCR was 52.3 mΩ.

Example 6

A battery was produced by using a negative electrode that was produced by mixing silicon (Si) into artificial graphite of a negative electrode active material. Composition of the negative electrode includes the artificial graphite/Si/polyvinylidene fluoride in a ratio of 94/1/5 (% by weight). Conditions other than them were similar to those in Example 1. As a result, its battery capacity was 1275 mAh, and its DCR was 51.2 mΩ.

Example 7

A positive electrode was produced similarly to Example 1 except for using $LiCoO_2$ instead of $LiMn_{1/3}Co_{1/3}Ni_{1/3}O_2$ of the positive electrode active material. Then, a battery was produced by using the positive electrode. Conditions other than them were similar to those in Example 1. As a result, its battery capacity was 1210 mAh, and its DCR was 54.1 mΩ.

Comparative Example 3

A battery was produced similarly to Example 7 except for not adding the additive A, and was then evaluated similarly to Example 7. As a result, its battery capacity was 1201 mAh, and its DCR was 55.3 mΩ.

Comparative Example 4

A battery was produced similarly to Example 8 except for not adding the additive A, and was then evaluated similarly to Example 8. As a result, its battery capacity was 1235 mAh, and its DCR was 54.3 mΩ.

TABLE 1

|  | First Additive | Second Additive | Adding Amount of First Additive/ wt % | Adding Amount of Second Additive/ wt % | Battery Capacity/ mAh | DCR/ mΩ |
| --- | --- | --- | --- | --- | --- | --- |
| Example 1 | A | VC | 0.1 | 0.8 | 1250 | 52.0 |
| Example 2 | B | VC | 0.1 | 0.8 | 1245 | 52.1 |
| Example 3 | A | 1,3-propenesultone | 0.1 | 0.8 | 1251 | 53.2 |
| Example 4 | B | 1,3-propenesultone | 0.1 | 0.8 | 1248 | 53.6 |
| Example 5 | A | VC+ 1,3-propenesultone | 0.1 | 0.6 + 0.2 | 1255 | 52.3 |
| Example 6 | A | VC | 0.1 | 0.8 | 1275 | 51.2 |
| Example 7 | A | VC | 0.1 | 0.8 | 1210 | 54.1 |
| Example 8 | A | VC | 0.1 | 0.8 | 1240 | 53.5 |
| Comparative Example 1 | — | VC | 0 | 0.8 | 1249 | 54.2 |
| Comparative Example 2 | — | VC | 0 | 0.8 | 1250 | 52.7 |
| Comparative Example 3 | — | VC | 0 | 0.8 | 1201 | 55.3 |
| Comparative Example 4 | — | VC | 0 | 0.8 | 1235 | 54.3 |

Example 8

A battery was produced similarly to Example 1 except for using EC/EMC in a volume ratio of 1/1 instead of EC/DMC/EMO in the volume ratio of 1/2/2 as the solvent, and was then evaluated similarly to Example 1. Its battery capacity was 1240 mAh, and its DCR was 53.5 mΩ.

Comparative Example 1

A battery was produced similarly to Example 1 except for not adding the additive A, and was then evaluated similarly to Example 1. As a result, its battery capacity was 1249 mAh, and its DCR was 54.2 mΩ.

Comparative Example 2

A battery was produced similarly to Example 6 except for not adding the additive A, and was then evaluated similarly to Example 6, As a result, its battery capacity was 1250 mAh, and its DCR was 52.7 mΩ.

Comparing Examples 1 and 2 and Comparative Example 1, the direct current resistance (DCR) in either of Examples 1 and 2 is lower than that in Comparative Example 1. From these results, it is noted that, by adding the compound represented by Formula (1) into the electrolytic solution, the battery resistance can be decreased. As a result, the battery with high output can be provided.

From Example 6 and Comparative Example 2, it is noted that, even in the case of using the negative electrode that was produced by mixing the silicon (Si) into the artificial graphite, the battery resistance can be decreased by adding the compound represented by Formula (1) into the electrolytic solution.

From Example 7 and Comparative Example 3, it is noted that, even in the case of using $LiCoO_2$ as the positive electrode active material, the battery resistance can be decreased by adding the compound represented by Formula (1) into the electrolytic solution.

From Example 8 and Comparative Example 4, it is noted that, even in the case where the solvent of the electrolytic solution was EC/EMC in the volume ratio of 1/1, the battery resistance can be decreased by adding the compound represented by Formula (1) into the electrolytic solution.

From Examples 1 and 2, it is noted that, by using the compound represented by the formula (3) as the additive, both of the high capacity and the low resistance can be realized.

From Examples 1 and 3, it is noted that, by using the VC as the second additive, the direct current resistance (DCR) can be decreased. Further, it is noted that, by using 1,3-propenesultone as the second additive, the battery capacity can be improved.

What is claimed is:

1. An additive of electrolytic solution for a lithium secondary battery, which is represented by Formula (1),

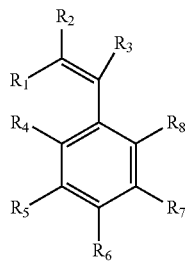

(1)

wherein $R_1$ to $R_3$ respectively denote any of hydrogen, an alkyl group and a functional group containing halogen; $R_4$ to $R_8$ respectively denote any of hydrogen, a hydrocarbon group, a functional group containing halogen and $BF_3X$; X denotes an alkali earth metal or an alkali metal selected from the group consisting of Na and K; and at least any of $R_4$ to $R_8$ is $BF_3X$.

2. An electrolytic solution for a lithium secondary battery comprising: an electrolyte salt comprising lithium, a nonaqueous solvent, and an additive of electrolytic solution for a lithium secondary battery, wherein the additive of electrolytic solution for a lithium secondary battery, is represented by Formula (1),

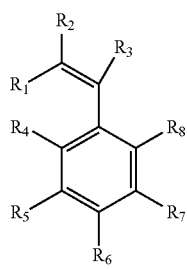

(1)

wherein $R_1$ to $R_3$ respectively denote any of hydrogen, an alkyl group and a functional group containing halogen; $R_4$ to $R_8$ respectively denote any of hydrogen, a hydrocarbon group, a functional group containing halogen and $BF_3X$; X denotes an alkali earth metal or an alkali metal selected from the group consisting of Na and K; and at least any of $R_4$ to $R_8$ is $BF_3X$.

3. The electrolytic solution for a lithium secondary battery according to claim 2, wherein an adding amount of the additive is 5% by mass or less of a total mass of the nonaqueous solvent and the electrolyte salt.

4. The electrolytic solution for a lithium secondary battery according to claim 2, further comprising at least any of vinylene carbonate, fluoroethylene carbonate and 1,3-propenesultone.

5. The electrolytic solution for a lithium secondary battery according to claim 2, wherein:
the nonaqueous solvent contains cyclic carbonate and chain carbonate; and
when a volume of the cyclic carbonate is denoted by "a" and a volume of the chain carbonate is denoted by "b", a volume ratio (a/(a+b)) is within a range of 0≤a/(a+b)≤0.9.

6. A lithium secondary battery comprising an electrolytic solution, a positive electrode and a negative electrode, wherein:
the electrolytic solution contains an electrolyte salt comprising lithium, a nonaqueous solvent and an additive; and
the additive contains a compound represented by Formula (1),

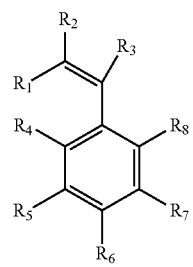

(1)

wherein $R_1$ to $R_3$ respectively denote any of hydrogen, an alkyl group and a functional group containing halogen; $R_4$ to $R_8$ respectively denote any of hydrogen, a hydrocarbon group, a functional group containing halogen and $BF_3X$; X denotes an alkali earth metal or an alkali metal selected from the group consisting of Na and K; and at least any of $R_4$ to $R_8$ is $BF_3X$.

7. The lithium secondary battery according to claim 6, wherein an adding amount of the compound represented by Formula (1) is 5% by mass or less of a total mass of the nonaqueous solvent and the electrolyte salt.

8. The lithium secondary battery according to claim 6, wherein the electrolytic solution further contains at least any of vinylene carbonate, fluoroethylene carbonate and 1,3-propenesultone.

9. The lithium secondary battery according to claim 6, wherein:
the nonaqueous solvent contains cyclic carbonate and chain carbonate; and
when a volume of the cyclic carbonate is denoted by "a" and a volume of the chain carbonate is denoted by "b", a volume ratio (a/(a+b)) is within a range of 0≤a/(a+b)≤0.9.

* * * * *